Nov. 29, 1932.  R. PUDELKO  1,889,419
ELECTRICITY METER
Filed Sept. 16, 1930

INVENTOR
Riccard Pudelko
BY
John D. Morgan
ATTORNEY

Patented Nov. 29, 1932

1,889,419

UNITED STATES PATENT OFFICE

RICCARD PUDELKO, OF ZUG, SWITZERLAND, ASSIGNOR TO LANDIS & GYR, A-G., A CORPORATION OF SWITZERLAND

ELECTRICITY METER

Application filed September 16, 1930, Serial No. 482,180, and in Switzerland October 9, 1929.

The present invention relates to a new and useful electricity meter and more particularly to excess demand meters in which the registration of the energy consumed takes place only when a predetermined limit is exceeded.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention.

Of the drawing:—

Figure 1:
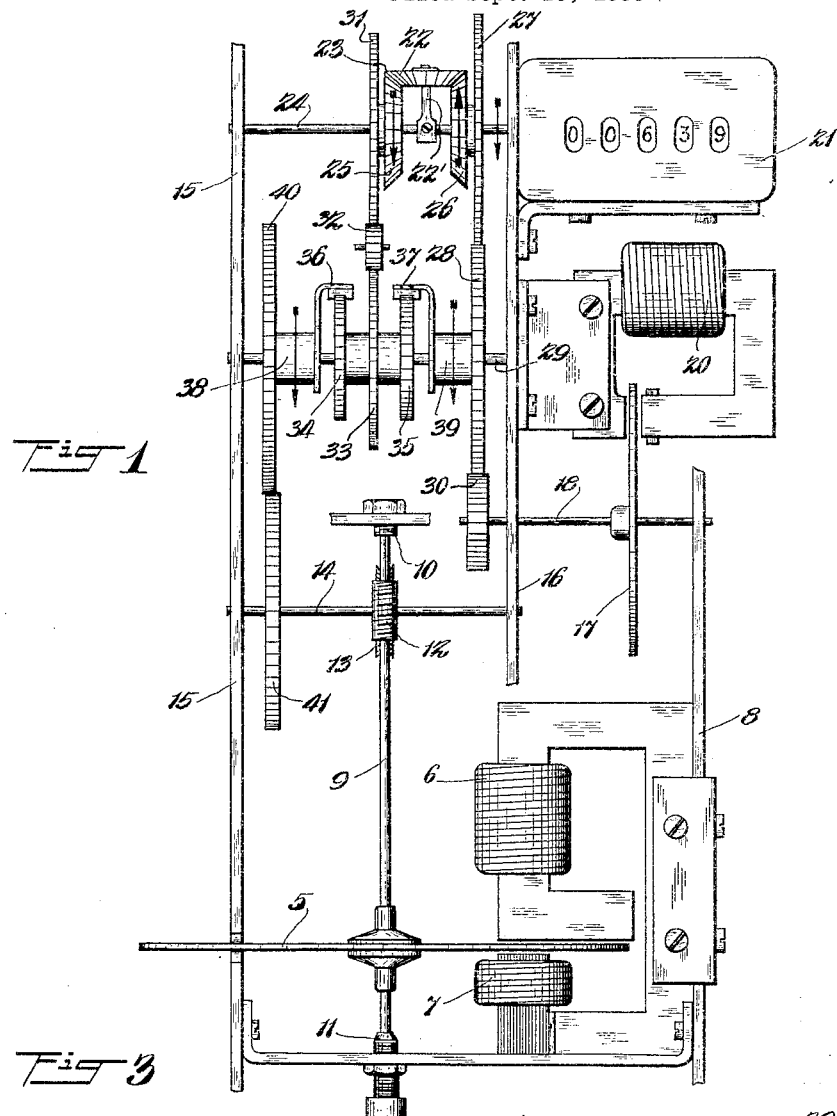
Figure 1 is a side elevation of the present preferred and illustrative embodiment of the invention.

The present invention has for its object the provision of an excess demand meter which will give a very accurate registration of the energy consumed in excess of a predetermined rate limit even when the rate of consumption approaches the limit. A further object of the invention is the elimination of the errors in registration which have existed in the former types of excess demand meters.

In excess demand meters of the type heretofore generally employed, a differential gear is usually employed having one bevel gear driven in accordance with the load on the meter, while the other bevel gear is driven by a constant speed mechanism, the difference in rotation between the two gears being transmitted to the bevel pinion of the differential and then to the register of the meter through a one-way clutch which prevents the transmission of any movement due to the constant speed mechanism. In meters of this prior type, large errors are introduced into the registration by reason of the play or lost motion existing in the spur gearing, the differential gears and the clutch mechanism, and these errors become more noticeable the lower the quality of the gearing and the nearer the energy consumption rate approaches the predetermined limit at which registration begins.

In accordance with the present preferred embodiment of the invention, one of the bevel gears of the differential gearing is coupled to the constant speed mechanism and the other bevel gear is coupled to an overrunning clutch adapted to be alternatively driven by the constant speed mechanism or the metering mechanism, whichever is running at the faster rate. The planet wheel of the differential always rotates, if at all, in the same direction, and for this reason whatever play is present in the gearing does not affect the final accuracy of the meter.

It will be understood that the foregoing general description and the following detailed description as well, are exemplary and explanatory of the invention, but are not restrictive thereof.

Referring now in detail to the present preferred and illustrative embodiment of the invention as shown in the accompanying drawing, the invention is shown as applied to a meter for the measurement of electrical energy, such as a Ferraris meter, although other types of electricity meters and meters for the measurement of other quantities may be substituted therefor. In this embodiment, there is provided a meter disc 5 adapted to be driven proportionally to energy consumption by means of the voltage and current driving magnets 6 and 7 mounted on the side frame 8. The meter disc 5 is rotatably supported by its spindle 9 which is journaled in the usual spindle bearings 10 and 11, the spindle carrying a worm 12 meshing with worm gear 13 on shaft 14 journaled in the side frames 15 and 16.

A constant speed mechanism is provided for preventing registration of energy consumption until the rate of consumption is in excess of a predetermined rate limit and may be of any desired form. In the preferred embodiment it comprises a disc 17 of copper or aluminium, rotatably journaled in side frames 8 and 16 by means of a shaft 18 and is rotated at a constant speed by means of the rotating field produced by the driving magnet 20. Any other suitable form of constant speed mechanism may be employed, however, if desired.

The excess demand register 21, of conventional construction, comprises the usual counting train and is connected through shaft 24 to the bevel pinion 22 of a differential gear 23. The bevel pinion 22 is rotatably mounted on an arm 22' which is fast to the shaft 24 and the pinion meshes with the bevel gears 25 and 26 which are freely rotatably on the shaft.

One of the bevel gears of the differential gear is adapted to be driven by the constant speed mechanism and for this purpose, gear 27, mounted at one side of the bevel gear 26 and fast thereto, meshes with gear 28 freely rotatable on shaft 29 and also meshes with a pinion 30 which is fast on the shaft 18.

The other bevel gear of the differential is driven in a reverse direction and at a speed equal to that of the bevel gear 26 except when the rate of energy consumption exceeds the predetermined limit, and is driven faster than the bevel gear 26 when the rate of energy consumption exceeds the predetermined rate limit. For this purpose, the bevel gear 25 is connected with both the constant speed mechanism and the metering mechanism and is adapted to be alternatively driven by the faster running of these two mechanisms. In the illustrative embodiment, gear 31, mounted at one side of and fast to the bevel gear 25, meshes with an idler pinion 32 which is driven by the overrunning clutch gear 33. At the sides of gear 33 are ratchet wheels 34 and 35, formed integral with the gear 33, coacting with ratchets 36 and 37, respectively. These ratchets are mounted on individual sleeves 38 and 39 which are freely rotatable on shaft 29 and are fast with respect to their respective gears 40 and 28. Gear 40 meshes with gear 41 which is mounted on shaft 14 and is driven by the meter disc 9 through worm gearing 12, 13. The ratio of gears 31, 33 and 27, 28 is such that the constant speed mechanism drives the bevel gears 25 and 26 at equal speeds in opposite directions thereby normally holding the bevel pinion 22 against revolution and preventing rotation of shaft 24.

Figures 2, 3:
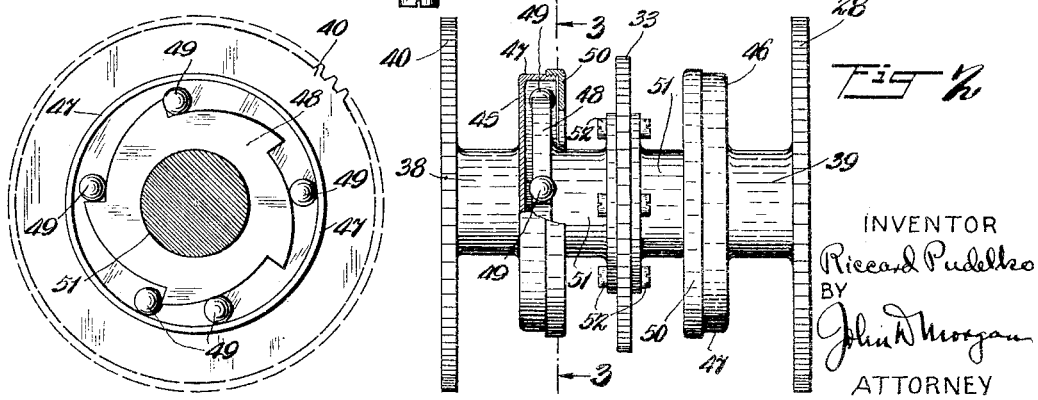
Figure 2 is a fragmentary side elevation, partly in section, of a modified embodiment of the invention.
Figure 3 is a vertical section taken on the line 3—3 of Figure 2.

In accordance with a modified embodiment of the invention, for use where a still higher degree of accuracy in the registration is demanded, friction clutches are substituted for the ratchet clutches illustrated in Figure 1. As shown in Figures 2 and 3, gear wheel 33 is connected to gears 28 and 40, at either side, by means of the one-way friction clutches 45 and 46 respectively, and gear 33 in alternatively driven by gear 28 or 40, whichever is running at the higher speed. These friction clutches each comprise a ring 47, formed on the inner end of the sleeve 38 or 39, within which are received the spider 48 and the small balls 49. For retaining the balls in position, an annular cover member 50 is threaded over ring 47. Spider 48 is preferably formed integral with the sleeves 51 which are rigidly fastened to gear 33 by screws 52.

The operation of the illustrative meter may be summarized as follows:

When energy is being consumed at less than the predetermined rate limit, disc 17 is driven at a constant speed by the rotating field produced by magnet 20, driving gears 28 and 33 at equal speeds and bevel gears 25 and 26 at equal speeds in opposite directions. The meter disc 5, rotating at a speed corresponding to energy consumption at less than the predetermined rate limit, drives gear 40 at a speed less than that of gear 33 and, due to the overrunning clutch, is without effect on the speed of bevel gear 25. As the speed of bevel gears 25 and 26 is equal and opposite, bevel pinion 22 rotates but does not revolve and register 21 is not actuated.

When energy is consumed at a rate equal to the predetermined rate limit, the same operation occurs, as ratchets 36 and 37 are driven at the same speed.

When energy is consumed at a rate in excess of the predetermined rate limit, bevel gear 26 is driven at the constant speed by the constant speed mechanism. Gear 40 is driven by the meter disc at a speed faster than that of gear 28, thereby driving gear 33 at the faster rate and causing the bevel gear 25 to be rotated faster than bevel gear 26 and in the opposite direction thereto. This difference in speed between the bevel gears causes the bevel pinion 22 to revolve, rotating shaft 24 and actuating register 21 proportionally to the excess in the rate of energy consumption.

In the illustrated embodiment, the predetermined rate limit is determined by the relative speeds of the constant speed mechanism and the metering disc as well as by the ratio of the gears 40 and 41, and, of course, this predetermined rate may be varied at will by varying the ratio of these gears.

The invention in its broader aspects is not limited to the specific mechanisms shown and described but departures may be made therefrom within the scope of the accompanying claims without departing from the principles of the invention and without sacrificing its chief advantages.

What I claim is—

1. An excess demand meter including in combination a register, a differential gear having its planet wheel coupled with the register, a meter disc driven proportionally to energy consumption, constant speed mechanism for driving one of the sun wheels of the differential, and an overrunning clutch connected with the other sun wheel to drive the sun wheel alternatively by the meter disc or constant speed mechanism.

2. An excess demand meter including in combination a differential gear, a register driven by the planet wheel of the differential, a metering element driven proportionally to energy consumption, constant speed mechanism for driving one of the sun wheels of the differential and two one way clutches for driving the other sun wheel of the differential, one of said clutches being connected to the metering element and the other of said clutches being connected to the constant speed mechanism whereby the register registers only the energy consumed in excess of a predetermined rate.

3. An excess demand meter including in combination a differential gear, a register driven by the planet wheel of the differential, a metering element driven proportionally to energy consumption, means for driving both sun wheels at a predetermined speed one oppositely to the other and means for alternatively driving one of the sun wheels in its normal direction at a speed faster than its predetermined speed by the metering element when the energy consumption exceeds a predetermining rate.

In testimony whereof, I have signed my name to this specification.

RICCARD PUDELKO.